(12) United States Patent
Wada et al.

(10) Patent No.: US 9,171,270 B2
(45) Date of Patent: Oct. 27, 2015

(54) GAS DEMAND PREDICTION SYSTEM AND GAS DEMAND PREDICTION METHOD

(71) Applicant: NIPPON GAS CO., LTD., Tokyo (JP)

(72) Inventors: Shinji Wada, Tokyo (JP); Shingo Dekamo, Tokyo (JP)

(73) Assignee: Nippon Gas Co., Ltd., Tokyo (JP)

( * ) Notice: Subject to any disclaimer, the term of this patent is extended or adjusted under 35 U.S.C. 154(b) by 0 days.

(21) Appl. No.: 14/406,356

(22) PCT Filed: Jun. 7, 2013

(86) PCT No.: PCT/JP2013/003619
§ 371 (c)(1),
(2) Date: Dec. 8, 2014

(87) PCT Pub. No.: WO2013/183309
PCT Pub. Date: Dec. 12, 2013

(65) Prior Publication Data
US 2015/0149097 A1    May 28, 2015

(30) Foreign Application Priority Data
Jun. 8, 2012    (JP) .................................. 2012-130614

(51) Int. Cl.
*G01F 23/00* (2006.01)
*G06F 17/40* (2006.01)
*G01D 21/00* (2006.01)
(Continued)

(52) U.S. Cl.
CPC ................ *G06Q 10/04* (2013.01); *G01D 21/00* (2013.01); *G01F 3/00* (2013.01); *G01F 23/00* (2013.01); *G06F 17/40* (2013.01); *G06Q 50/06* (2013.01);
(Continued)

(58) Field of Classification Search
None
See application file for complete search history.

(56) References Cited

U.S. PATENT DOCUMENTS 5,930,773 A * 7/1999 Crooks et al. .................... 705/30
5,943,656 A * 8/1999 Crooks et al. .................... 705/30
(Continued)

FOREIGN PATENT DOCUMENTS

JP    H08329159    12/1996
JP    2000-314664    11/2000
(Continued)

OTHER PUBLICATIONS

The International Preliminary Report on Patentability mailed Dec. 18, 2014 for PCT application No. PCT/JP2013/003619, 8 pages.
(Continued)

*Primary Examiner* — Edward Cosimano
(74) *Attorney, Agent, or Firm* — Lee & Hayes, PLLC (57) ABSTRACT

A delivery server comprises: a reception unit configured to receive sets of meter indication data of a plurality of gas meters; a storage device configured to store the respective sets of meter indication data; a gas usage calculating unit configured to calculate a gas usage on a basis of comparison between corresponding sets of meter indication data; a first rate-of-change calculating unit configured to calculate a rate of change in a past gas usage consumed in each of a plurality of supply facilities on a basis of comparison between a plurality of gas usages in a time of earlier than a meter indication date of the received sets of meter indication data by a predetermined period of time; and a prediction unit configured to modify the gas usage in accordance with the rate of change and predict the modified gas usage as a prospective gas usage to be consumed.

7 Claims, 9 Drawing Sheets

(51) Int. Cl.
    *G06Q 10/08*     (2012.01)
    *G06Q 50/06*     (2012.01)
    *G06F 19/00*     (2011.01)
    *G08C 25/00*     (2006.01)
    *G06Q 10/04*     (2012.01)
    *G01F 3/00*     (2006.01)

(52) U.S. Cl.
    CPC ............... *G06F 19/00* (2013.01); *G06Q 10/08* (2013.01); *G08C 25/00* (2013.01)

(56) References Cited

U.S. PATENT DOCUMENTS

| | | | | |
|---|---|---|---|---|
| 6,035,285 | A * | 3/2000 | Schlect et al. | 705/30 |
| 6,049,791 | A * | 4/2000 | Lerner | 705/412 |
| 6,052,671 | A * | 4/2000 | Crooks et al. | 705/34 |
| 6,088,688 | A * | 7/2000 | Crooks et al. | 705/412 |
| 6,122,603 | A * | 9/2000 | Budike, Jr. | 702/182 |
| 6,311,105 | B1 * | 10/2001 | Budike, Jr. | 700/291 |
| 7,222,111 | B1 * | 5/2007 | Budike, Jr. | 705/412 |
| 7,788,189 | B2 * | 8/2010 | Budike, Jr. | 705/400 |
| 7,870,080 | B2 * | 1/2011 | Budike, Jr. | 705/412 |
| 2003/0193405 | A1 * | 10/2003 | Hunt et al. | 340/870.02 |
| 2007/0143046 | A1 * | 6/2007 | Budike | 702/62 |
| 2008/0046388 | A1 * | 2/2008 | Budike | 705/412 |
| 2015/0178653 | A1 * | 6/2015 | Wada et al. | G06Q 10/063515 |

FOREIGN PATENT DOCUMENTS

| | | |
|---|---|---|
| JP | 2001266279 | 9/2001 |
| JP | 2006260340 | 9/2006 |
| JP | 2009251742 | 10/2009 |
| WO | WO 2004/015837 A2 * | 2/2004 |

OTHER PUBLICATIONS

The PCT Search Report mailed Jul. 23, 2013 for PCT application No. PCT/JP2013/003619, 2 pages.

* cited by examiner

| CUSTOMER ID | METER NUMBER | ... | GAS CYLINDER CAPACITY | NUMBER OF CYLINDERS | ENTIRE/HALF CLASSIFICATION | AREA CODE |
|---|---|---|---|---|---|---|
| A0001 | 56AB001 | ... | 50kg | 1 | 1 | 18 |
| A0001 | 56AB002 | ... | 50kg | 2 | 2 | 18 |
| A0003 | 56AB003 | ... | 30kg | 1 | 1 | 19 |
| ... | ... | ... | ... | ... | ... | ... |

| CUSTOMER ID | AREA CODE | CUSTOMER ID | METER NUMBER | METER READING DATE | METER INDICATION | ... |
|---|---|---|---|---|---|---|
| --- | 18 | A0001 | 56AB321 | 2012/3/30 | 235.2 | ... |
| --- | 18 | A0002 | 56AB222 | 2012/3/30 | 200.5 | ... |
| --- | 18 | A0003 | 56AB001 | 2012/3/30 | 210.3 | ... |
| ... | ... | ... | ... | ... | ... | ... |

EXAMPLE OF PREVIOUS YEAR'S RECORD OF CUSTOMER A0001

| JANUARY | FEBRUARY | MARCH | — — |
|---------|----------|-------|-----|
| 4.0     | 4.2      | 3.0   |     |

$$\alpha = \frac{4.2}{4.0} \qquad \alpha = \frac{3.0}{4.2}$$

FIG.7 d80

EXAMPLE OF PREVIOUS YEAR'S RECORD OF AREA 18

| JANUARY | FEBRUARY | MARCH | --- |
|---|---|---|---|
| 3.8 | 4.0 | 3.0 | |

$\beta = \dfrac{4.0}{3.8}$    $\beta = \dfrac{3.0}{4.0}$

GAS DEMAND PREDICTION SYSTEM AND GAS DEMAND PREDICTION METHOD

TECHNICAL FIELD

The present invention relates to a system and a method of predicting demand of liquefied petroleum (LP) gas.

BACKGROUND ART

It is known that supply of LP gas is based on imports from gas producing countries and domestic production as a by-product in the course of producing petroleum products. Petroleum refining terminals and import terminals for storing LP gas carried from gas producing countries by tankers are respectively referred to as primary terminals. LP gas is loaded into domestic vessels and/or tank trucks in the primary terminals and is shipped to secondary terminals located on the coast or inland as hub terminals for LP gas transportation. Further, LP gas carried to the secondary terminals is transported to LP gas filling stations in various locations, i.e., delivery branches, and is then injected into gas cylinders (gas canisters) in the delivery branches.

The gas cylinders, filled with LP gas in the respective filling stations, are delivered to customers' places such as residential houses, apartment houses and work places by deliverymen. Empty gas cylinders in the customers' places are replaced with full gas cylinders, and are brought back to the respective filling stations. In each filling station, a fixed delivery area is assigned to each deliveryman as an area of which he/she is in charge. Each deliveryman is given delivery tickets to be delivered to customers' places within his/her responsible delivery area in 2 to 10 days.

The delivery tickets are created by a delivery manager. First, the amount of LP gas remaining in each gas cylinder is predicted based on a past gas usage history of each customer, a meter indication of a gas meter in each customer's place, a delivery history and so forth, and the next delivery due date of each gas cylinder is determined. The number of gas cylinders to be delivered in 2 to 10 days is determined by accumulating the number of gas cylinders of all the customers within the delivery area of which each deliveryman is in charge.

In replacing a gas cylinder based on a delivery ticket, a deliveryman fills in the respective items of the delivery ticket including a replacement date, a meter indication on the date, a cylinder number and a safety inspection. When a daily delivery work is finished, delivery tickets are handed in to the delivery manager. The delivery manager checks if each delivery ticket returned to him/her includes incomplete items, and then, stores each checked delivery ticket as data for calculating the next delivery due date. Under the aforementioned mechanism, a system for enhancing efficiency in delivery of a gas cylinder has been proposed (see PTL 1).

As disclosed in PTL 1, the system for enhancing efficiency in delivery of a gas cylinder has conventionally existed, but has had a problem that prospective gas demand could not have been predicted with better accuracy.

CITATION LIST

Patent Literature

PTL 1: Japan Patent Laid-Open No. H08-329159 (1996)

SUMMARY OF INVENTION

In view of the aforementioned situation, it is an object of the present invention to provide a gas demand prediction system and a gas demand prediction method whereby prospective gas demand can be predicted with better accuracy.

To solve the aforementioned problem, the present invention relates to a gas demand prediction system of predicting gas usages in a plurality of supply facilities. The gas demand prediction system comprises: a reception unit configured to receive respective sets of meter indication data of a plurality of gas meters in the plurality of supply facilities; a storage unit configured to store the respective sets of meter indication data of the plurality of supply facilities; a gas usage calculating unit configured to calculate the gas usage consumed in each of the plurality of supply facilities on a basis of comparison between corresponding sets of meter indication data stored in the storage unit; a first rate-of-change calculating unit configured to calculate a first rate of change in a past gas usage in each of a plurality of gas cylinders on a basis of comparison between corresponding sets of meter indication data of the each of the plurality of gas cylinders; and a prediction unit configured to modify the calculated gas usage in accordance with the first rate of change and predict the modified gas usage as a prospective gas usage to be consumed in the each of the plurality of supply facilities.

Furthermore, to solve the aforementioned problem, the present invention relates to a gas demand prediction method by which a computer predicts gas usages in a plurality of supply facilities. The gas demand prediction method comprises the steps of: receiving respective sets of meter indication data of a plurality of gas meters in the plurality of supply facilities; storing the respective sets of meter indication data of the plurality of supply facilities in a storage unit; calculating the gas usage consumed in each of the plurality of supply facilities on a basis of comparison between corresponding sets of meter indication data stored in the storage unit; calculating a first rate of change in a past gas usage in each of a plurality of gas cylinders on a basis of comparison between corresponding sets of meter indication data of the each of the plurality of gas cylinders; and modifying the calculated gas usage in accordance with the first rate of change and predict the modified gas usage as a prospective gas usage to be consumed in the each of the plurality of supply facilities.

According to the present invention, prospective gas demand can be predicted with better accuracy.

DESCRIPTION OF EMBODIMENTS

Explanation will be hereinafter provided for a schematic configuration of a system in the present exemplary embodiment. The system is configured to predict a gas usage and a remaining gas amount in a gas cylinder installed in a supply facility on a basis of meter indication data including a meter indication of a gas meter.

Figure 1:
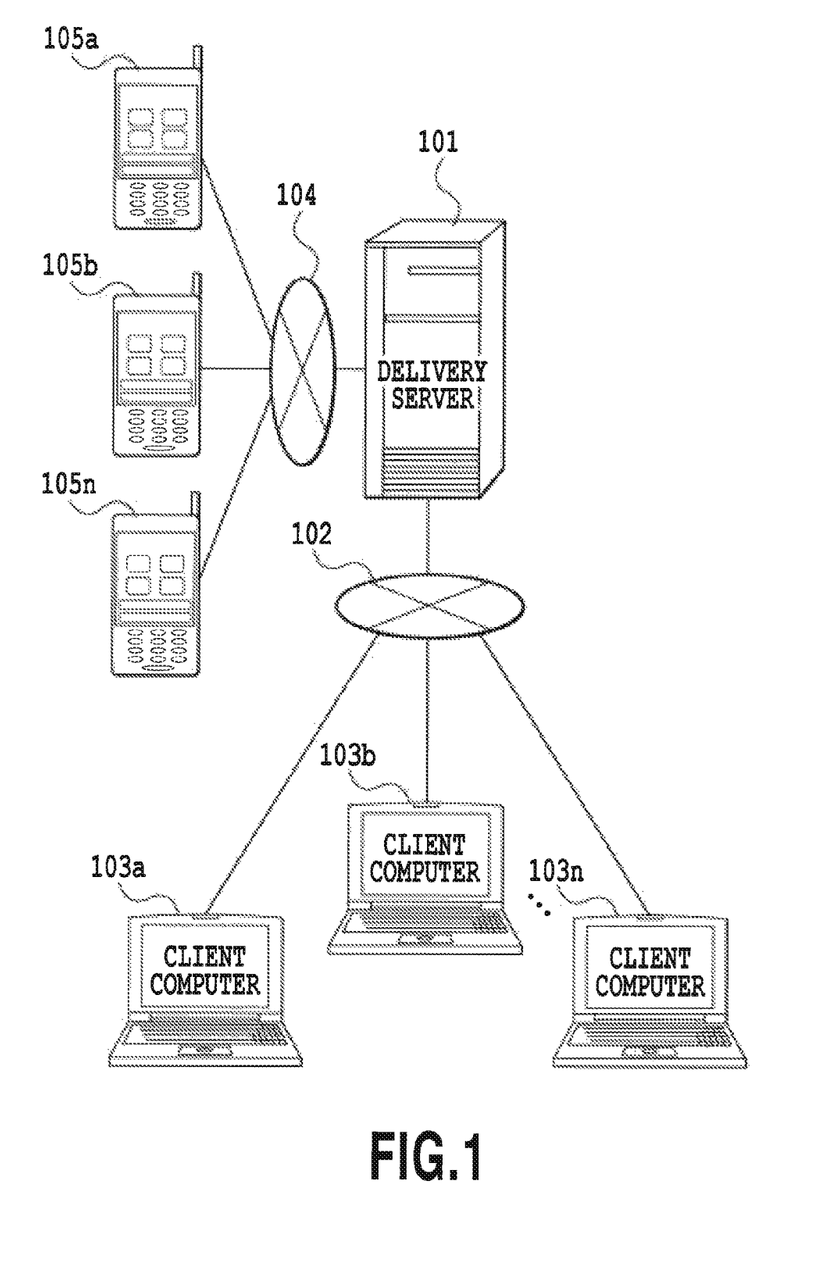
FIG. 1 is a diagram showing an exemplary network configuration according to an exemplary embodiment of the present invention.

FIG. 1 is a diagram showing a network configuration according to the exemplary embodiment of the present invention. In FIG. 1, a delivery server (gas demand prediction system) 101 is configured to be communicative with multiple client computers 103a, 103b ... 103n through a network 102. Further, the delivery server 101 is configured to be communicative with multiple mobile terminals 105a, 105b ... 105n through a network 104. It should be noted that the multiple client computers 103a-103n are collectively referred to as client computers 103, whereas the multiple mobile terminals 105a-105n are collectively referred to as mobile terminals 105.

The client computers 103 are terminals located in a delivery center of managing deliveries from the respective delivery branches in a unified manner, for instance, and are used by users in the delivery center. A user establishes a connection to the delivery server 101 through a client computer 103 and exclusively performs various delivery tasks such as confirmation of a delivery status and an instruction of creating delivery data. It should be noted that the client computers 103 may be located in, for instance, delivery branches or so forth.

The mobile terminals 105 are terminals to be used by workers (including e.g., meter readers, deliverymen, safety inspectors, etc.) who read meter indications of gas meters respectively installed in the supply facilities equipped with gas cylinders. The mobile terminals 105 respectively include a CPU, a memory, an input device, a display device and so forth. The aforementioned workers collect sets of meter indication data, respectively including a meter indication of each gas meter, through the mobile terminals 105 and transmit the collected sets of meter indication data to the delivery server 101. It should be noted that each set of meter indication data is transmitted to the delivery server 101, for instance, in reading a gas meter, in opening/closing a valve, in conducting a safety inspection, in delivering one or more gas cylinders and so forth.

[Configuration of Delivery Server]

Figure 2:
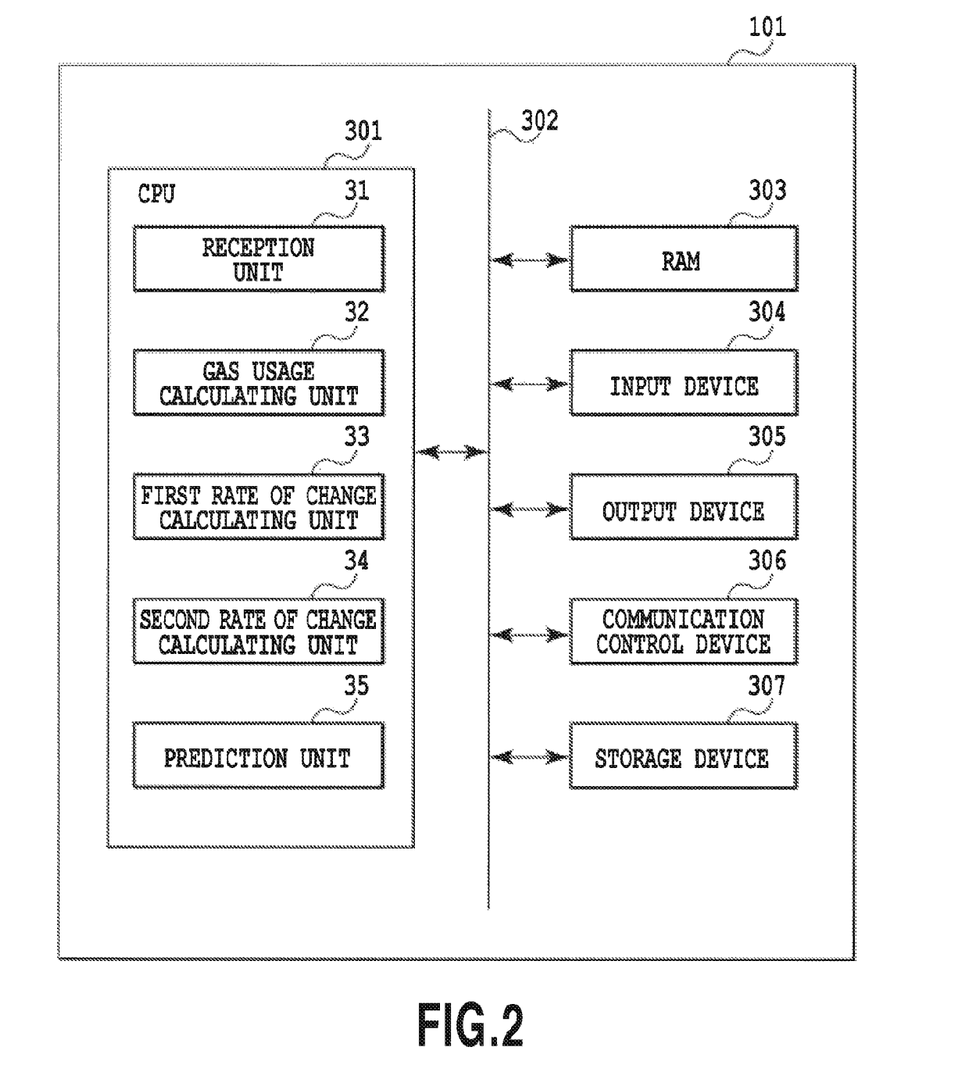
FIG. 2 is a block diagram showing an exemplary configuration of a delivery server according to the exemplary embodiment of the present invention.

FIG. 2 is a block diagram showing an exemplary configuration of the delivery server 101. It should be noted that FIG. 2 explains a configuration employing a single computer system, but the delivery server 101 may be configured as a part of a multifunctional distribution system comprising multiple computer systems.

As shown in FIG. 2, the delivery server 101 includes a CPU 301, a system bus 302, a RAM 303, an input device 304, an output device 305, a communication control device 306 and a storage device (storage unit) 307.

The CPU 301 is coupled to the respective component elements through the system bus 302, and is configured to perform a process of transferring control signals and data. Also, the CPU 301 is configured to run various software programs and perform arithmetic/logic processing and so forth in order to implement the entire operation of the delivery server 101.

The RAM 303 has a work area for storing temporarily data and the software programs.

The storage device 307 includes a non-volatile storage medium such as a ROM or a HDD, and has a program storage area for storing the software programs and a data storage area for storing data to be obtained on an as-needed basis, data as processing results, and so forth. For example, a software program is retrieved from the program storage area of the storage device 307 into the work area of the RAM 303, and is run by the CPU 301. Thus, the CPU 301 of the present exemplary embodiment implements functions of respective units 31 to 35 to be described.

As shown in FIG. 2, the CPU 301 includes a reception unit 31, a gas usage calculating unit 32, a first rate-of-change calculating unit 33, a second rate-of-change calculating unit 34 and a prediction unit 35.

The reception unit 31 is configured to receive respective sets of meter indication data of the gas meters in multiple supply facilities (gas cylinders). Each gas meter is configured to detect the gas usage in a gas cylinder, and the meter indication data includes a meter indication that indicates the remaining gas amount in the gas cylinder and so forth. Detailed explanation thereof will be described below.

The gas usage calculating unit 32 is configured to calculate the gas usage consumed in each supply facility on the basis of comparison between respective sets of meter indication data. In the present exemplary embodiment, the meter indication data includes a meter indication that indicates the remaining gas amount in a gas cylinder. Thus, the gas usage calculating unit 32 is configured to calculate the gas usage on the basis of, for instance, ((a meter indication on the current meter reading date)−(a meter indication on the previous meter reading date)).

The first rate-of-change calculating unit 33 is configured to calculate a rate of change in the past gas usage in each gas cylinder on the basis of comparison between multiple sets of meter indication data of each gas cylinder. In the present exemplary embodiment, a ratio between a daily gas usage on the same month of the previous year as the current meter reading month and the daily gas usage on the same month of the previous year as the next month of the current meter reading month is used as an exemplary rate of change in the gas usage. Detailed explanation will be provided below for the processing of calculating change in the gas usage.

It should be noted that in the present exemplary embodiment, an explanation will be provided for a configuration to calculate a rate of change in the past gas usage. However, due to various reasons such as customer's transfer, a customer could have no gas usage record in the past depending on a situation. In this case, it is only required to preliminarily set information regarding how much gas to be used (e.g., an estimated usage) on the basis of the content of a contract with the customer (usage status, purpose of use, etc.) without calculating the rate of change in the past gas usage.

The second rate-of-change calculating unit 34 is configured to calculate a rate of change in the past gas usage in each area including multiple supply facilities on the basis of comparison among multiple sets of meter indication data of the multiple supply facilities located within each area. In the present exemplary embodiment, a ratio between an average in the daily gas usage within each area on the same month of the previous year as the current meter reading month and an average of the daily gas usages within each area on the same month of the previous year as the next month of the current meter reading month is used as an exemplary rate of change in the gas usage in each area. Detailed explanation will be provided below for the process of calculating the rate of change in the gas usage in each area.

The prediction unit 35 is configured to modify the gas usage in accordance with the rate of change in the gas usage and predict the modified gas usage as a prospective gas usage to be consumed in each supply facility. Detailed explanation will be provided below for the prediction processing.

Figure 3:
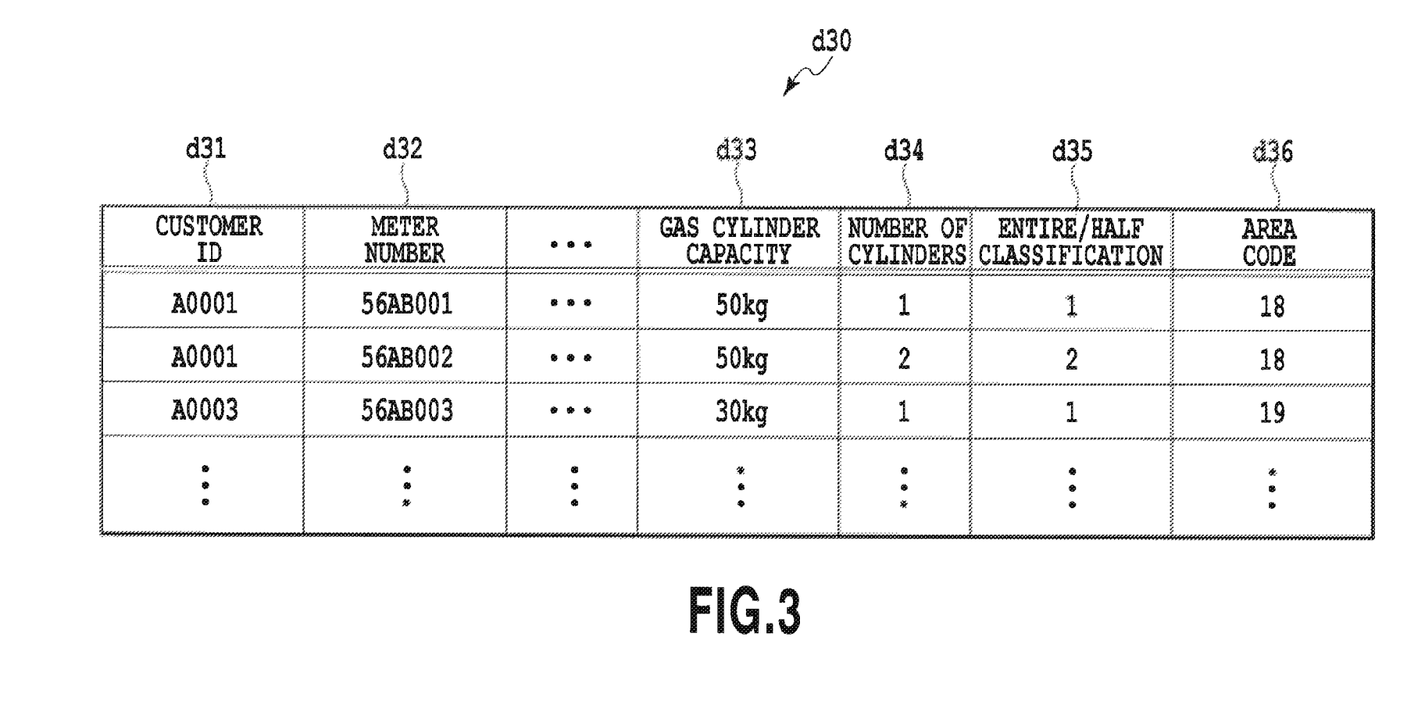
FIG. 3 is a diagram showing an exemplary configuration of customer information stored in a storage device of the delivery server according to the exemplary embodiment of the present invention.

FIG. 3 is a diagram showing an exemplary configuration of customer information d30 stored in the storage device 307 of the delivery server 101. As shown in FIG. 3, items stored in the storage device 307 include "customer ID" d31 for identifying each customer, "meter number" d32 for identifying each gas meter, and so forth. Further, items stored in the storage device 307 include "gas cylinder capacity" d33 indicating the capacity of each gas cylinder, "number of cylinders" d34 indicating the number of gas cylinders installed in each supply facility, "entire/half classification" d35 indicating whether or not a gas cylinder group composed of two banks of one or more gas cylinders should be entirely replaced, and "area code" d36 for identifying each area that one or more supply facilities are located. In the example of FIG. 3, "1" is set as the value of "entire/half classification" d35 when entire replacement is performed, whereas "2" is set as the value of "entire/half classification" d35 when half replacement is performed. When "1" indicating entire replacement is set, this means that the first bank of gas cylinder (or cylinders) is also replaced when the second bank of gas cylinder (or cylinders) is replaced. When "2" indicating half replacement is set, this means that the gas cylinders are replaced one by one.

For example, when predicting the remaining gas amount in the first bank of gas cylinder (or cylinders) in the gas cylinder group intended for entire replacement, the CPU 301 is configured to predict the remaining gas amount in the second bank of gas cylinder (or cylinders) in accordance with the calculated gas usage. In this case, the remaining gas amount is predicted based on a safety factor s. For example, the safety factor s is set in consideration of the capacity of a gas cylinder and previous delivery weight (usage record). For example, when the safety factor s has been preliminarily set to be 20% and the total capacity of the first and second banks of gas cylinders in a previous delivery is 400 kg, the CPU 301 determines that the total capacity of the first and second banks of gas cylinders in the previous delivery, i.e., an available remaining amount, is 320 kg on the basis of calculation of (400 kg×(100−s)/100).

[Operations of Delivery Server]

Figure 4:
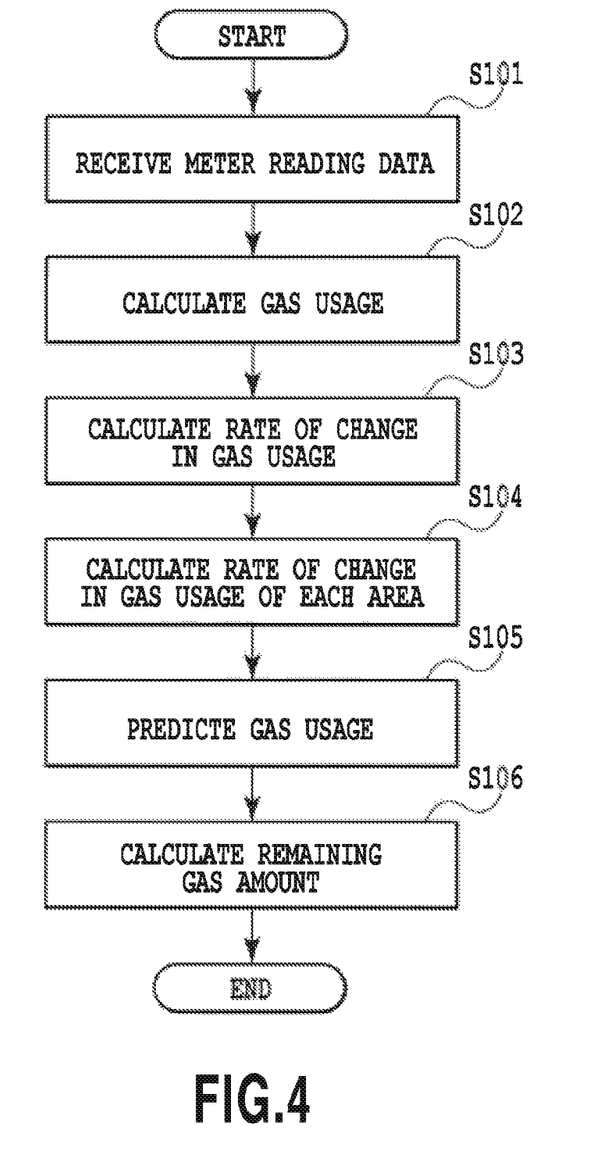
FIG. 4 is a flowchart showing an exemplary entire operation of the delivery server according to the exemplary embodiment of the present invention.
Figure 5:
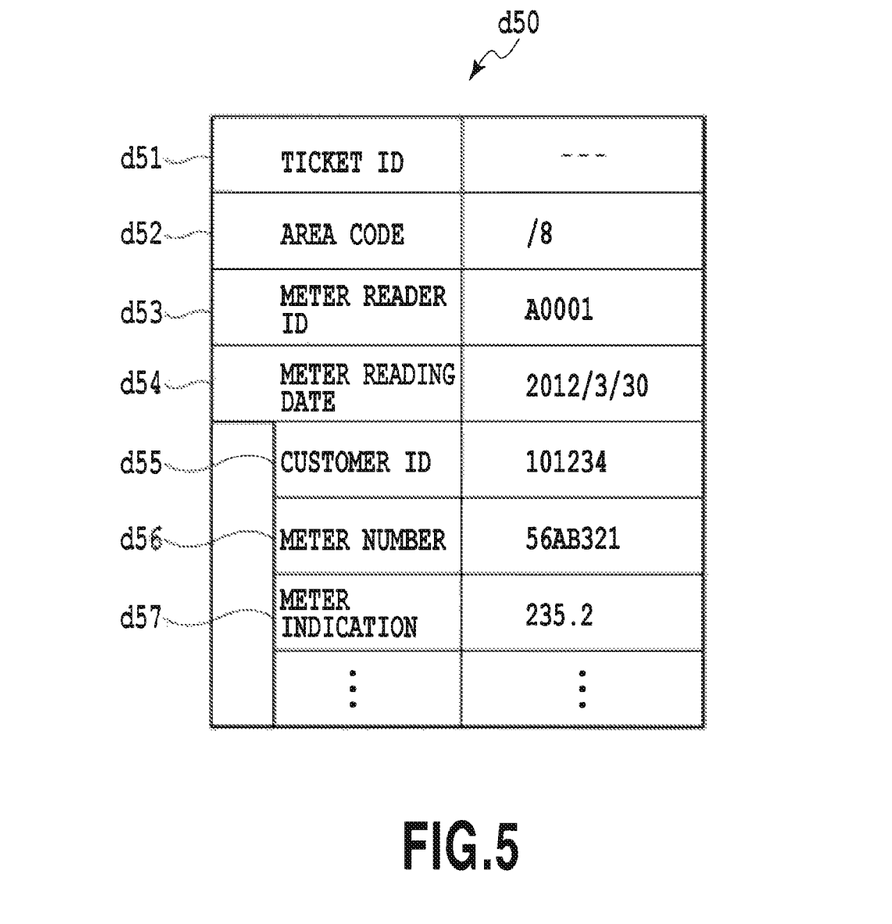
FIG. 5 is a diagram showing exemplary meter indication data in the exemplary embodiment of the present invention.
Figure 6:
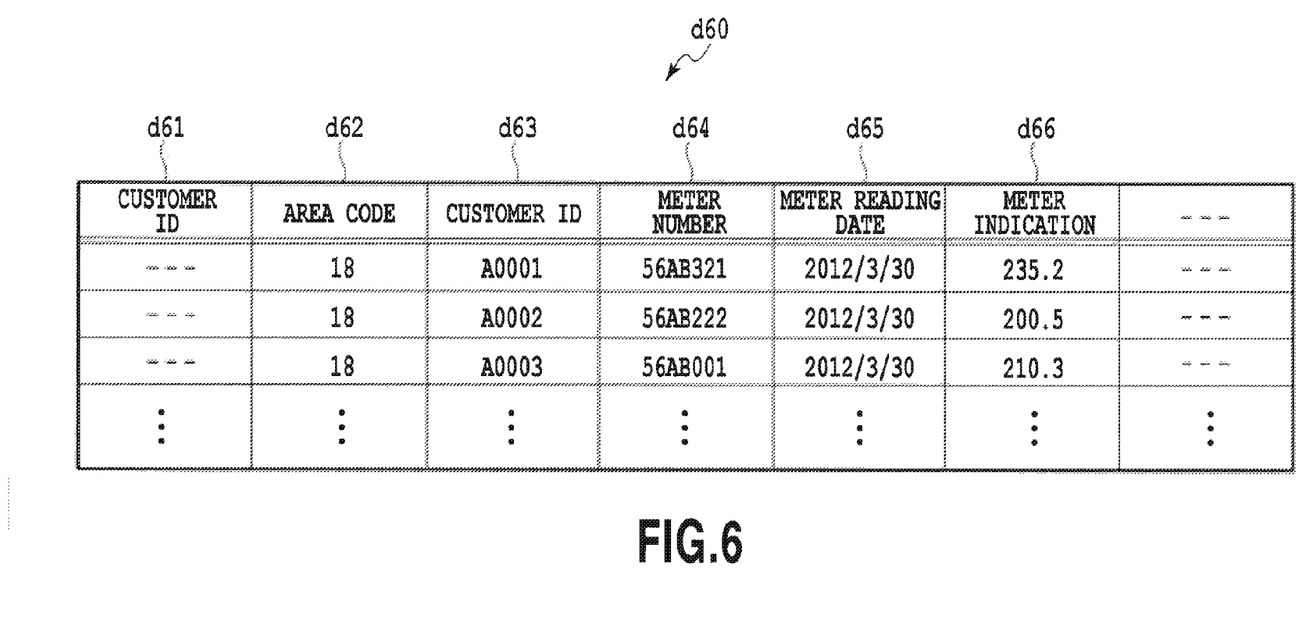
FIG. 6 is a diagram showing an exemplary data structures of multiple sets of meter indication data stored in the storage device of the delivery server according to the exemplary embodiment of the present invention.
Figure 7:
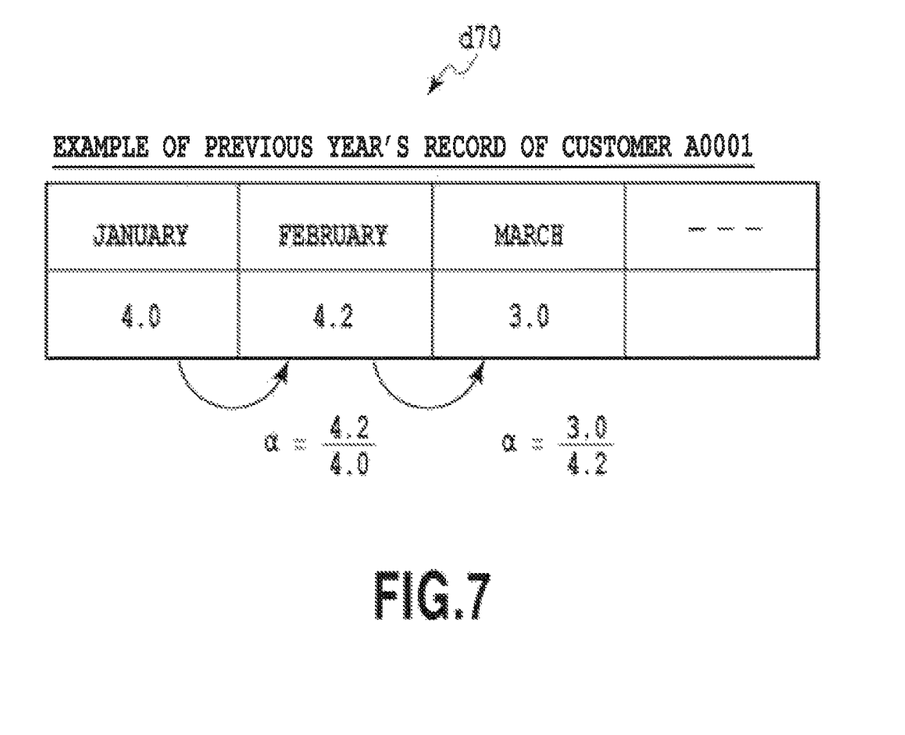
FIG. 7 is a diagram for explaining a previous year's record of the gas usage of a customer in the exemplary embodiment of the present invention.
Figure 8:
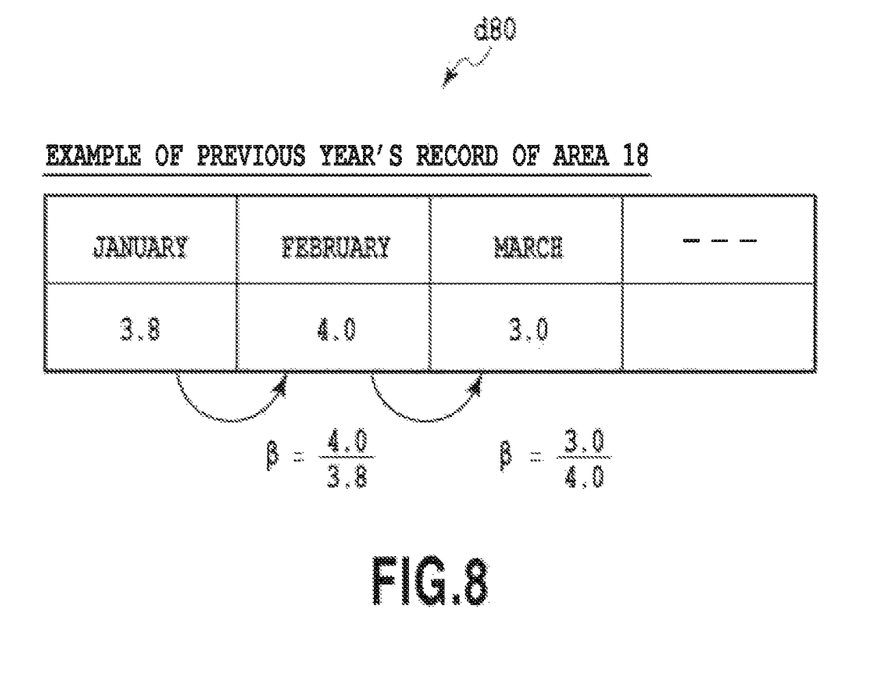
FIG. 8 is a diagram for explaining a previous year's record of the gas usage within an area in the exemplary embodiment of the present invention.
Figure 9:
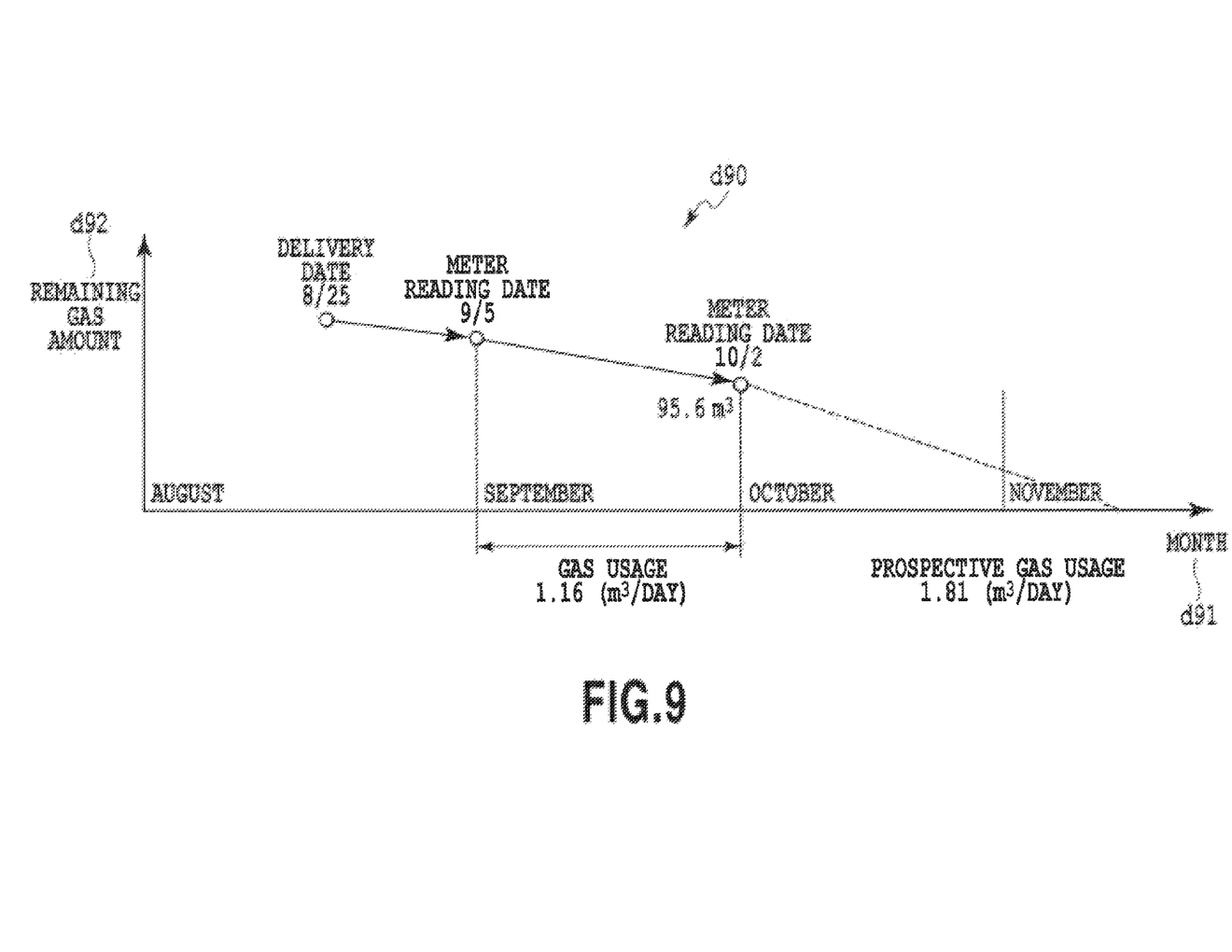
FIG. 9 is a diagram for explaining a schematic time-series procedure from delivery of a gas cylinder to meter reading of a gas meter.

Next, with reference to FIGS. 4 to 9, explanation will be provided for a method of predicting the gas usage and the remaining gas amount in a supply facility with use of meter indication data of a gas meter when the meter indication data is transmitted to the delivery server 101 from a mobile terminal 105. FIG. 4 is a flowchart showing an exemplary entire operation of the delivery server 101. FIG. 5 is a diagram showing exemplary meter indication data. FIG. 6 is a diagram showing an exemplary data structure of multiple sets of meter indication data stored in the storage device 307 of the delivery server 101. FIG. 7 is a diagram for explaining a record of the gas usage of a customer in the previous year. FIG. 8 is a diagram for explaining a record of the gas usage within an area in the previous year. FIG. 9 is a diagram for explaining a schematic time-series configuration from delivery of a gas cylinder to meter reading of a gas meter.

As an example, FIGS. 4 to 9 show an exemplary case that the delivery server 101 receives meter indication data in reading the gas meter. However, the delivery server 101 may be configured to receive meter indication data when opening/closing a valve, when conducting a safety inspection or when delivering the gas cylinder.

In FIG. 4, firstly, when the mobile terminal 105 transmits meter indication data of the gas meter to the delivery server 101, the CPU 301 (the reception unit 31) of the delivery server 101 receives the meter indication data (S101). Now, FIG. 5 shows exemplary meter indication data to be transmitted from the mobile terminal 105.

As shown in FIG. 5, meter indication data d50 includes meter reading ticket ID d51, area code d52, meter reader ID d53, meter reading date d54, customer ID d55, meter number d56, meter indication d57 and so forth. In the present exemplary embodiment, a QR code (registered trademark) (readable information code), for instance, is attached to the gas meter. Hence, the mobile terminal 105 is configured to be obtain meter indication data excluding a meter indication and a meter reading date by reading the QR code (registered trademark). It should be noted that the meter indication is obtained based on, for instance, an input operation by a meter reader, whereas the date on which the QR code (registered trademark) is read, for instance, is set as the meter reading date.

When receiving the meter indication data, the delivery server 101 is configured to cause the storage device 307 to store the meter indication data. FIG. 6 shows exemplary stored data.

As shown in a table d60 of FIG. 6, multiple sets of meter indication data, received by the CPU 301, are stored in the storage device 307. The table d60 includes customer ID d61, area code d62, customer ID d63, meter number d64, meter reading date d65 and meter indication d66.

In S102 of FIG. 4, the CPU 301 (the gas usage calculating unit 32) of the delivery server 101 is configured to calculate a gas usage A (m$^3$) consumed in the supply facility on the basis of comparison between the respective sets of meter reading data in the storage device 307.

In the present exemplary embodiment, for instance, the CPU 301 is configured to calculate the gas usage A (m$^3$) consumed in a period from the previous meter reading date to the current meter reading date on the basis of difference between a meter indication of the current meter indication data and that of the previous meter indication data.

Further, the CPU 301 is configured to calculate a daily gas usage based on the gas usage A (m$^3$), i.e., a gas usage N (m$^3$/day) in a period from the previous meter reading date to the current meter reading date. In this case, the aforementioned gas usage N (m$^3$/day) is calculated by a formula {the gas usage A (m$^3$)/(the number of days from the previous meter reading date to the current meter reading date)}.

In Step S103 of FIG. 4, the CPU 301 (the first rate-of-change calculating unit 33) of the delivery server 101 is configured to calculate a rate of change α in the past gas usage in each gas cylinder on the basis of comparison between sets of meter indication data of each gas cylinder. In this case, the CPU 301 is configured to read multiple sets of meter indication data to be compared from the storage device 307 and calculate the rate of change α in the gas usage on the same time in the past as the meter reading date on the basis of difference between meter indications of the respective sets of meter indication data.

For example, when the current meter reading of the gas meter is performed in February, a daily gas usage in February in the previous year and that in March in the previous year are used for calculating the rate of change α in the gas usage on the same time in the past as the meter reading date. In this case, the CPU 301 is configured to calculate a value of {(the daily gas usage in March in the previous year)/(the daily gas usage in February in the previous year)} on the basis of multiple sets of intended meter indication data and set the calculated value as the rate of change α in the gas usage consumed in the past.

It should be noted that (the daily gas usage in February in the previous year) is obtained by, for instance, a formula {(a meter indication of meter indication data in March in the previous year)−(a meter indication of meter indication data in February in the previous year)}/(the number of days from a meter reading date in February in the previous year to a meter reading date in March in the previous year), whereas (the daily gas usage in March in the previous year) is obtained by, for instance, a formula {(a meter indication of meter indication data in April in the previous year)−(the meter indication of meter indication data in March in the previous year)}/(the number of days from the meter reading date in March in the previous year to a meter reading date in April in the previous year).

In an example d70 of FIG. 7, the daily gas usage in February in the previous year is indicated as 4.2 m³, whereas the daily gas usage in March in the previous year is indicated as 3.0 m³. Thus, the rate of change α in the gas usage calculated by the CPU 301 is "α=3.0/4.2". Further, in FIG. 7, the rate of change α in the daily gas usage from January to February in the previous year is indicated as "α=4.2/4.0". Accordingly, the rate of increase or decrease α in the daily gas usage in the same time of the previous year is obtained.

It should be noted that in the present exemplary embodiment, the rate of change in the gas usage in the previous year is employed as the rate of change α in the gas usage consumed in the past, but alternatively, a rate of change in the gas usage in a period of time earlier than the previous year may be used instead.

In S104 of FIG. 4, the CPU 301 (the second rate-of-change calculating unit 34) of the delivery server 101 is configured to calculate a rate of change β in the past gas usage in the respective multiple supply facilities within each supply facility area on the basis of comparison between sets of meter indication data for the respective multiple supply facilities located in each supply facility area.

In this case, in S104 of FIG. 4, the CPU 301 of the delivery server 101 is configured to read all the multiple sets of meter indication data for the same area within a predetermined period from the storage device 307, calculate the rates of change of an average in the aforementioned gas usages in the same area on the basis of differences between meter indications in the respective sets of meter indication data, and set the calculated value as the rate of change β in the gas usage on an area basis.

For example, when the meter indication date of meter indication data is a date in February, the daily gas usage within the same area in February in the previous year and the daily gas usage within the same area in March in the previous year are used as the gas usages within the same area of a predetermined period. In this case, the CPU 301 is configured to calculate a value of {(an average of the daily gas usages within the intended area in March in the previous year)/(an average of the daily gas usages within the intended area in February in the previous year)} on the basis of the multiple sets of meter indication data within the intended area and is configured to set the calculated value as the rate of change β in the past gas usage consumed within the intended area. In this case, (the average in the daily gas usage within the intended area in February in the previous year) is calculated as, for instance, an average of (the daily gas usages in February in the previous year) for all the intended gas cylinders within the intended area, whereas (the average in the daily gas usage within the intended area in March in the previous year) is calculated as, for instance, an average of (the daily gas usages in March in the previous year) for all the intended gas cylinders within the intended area.

It should be noted that as described above, (the daily gas usage in February in the previous year) of each supply facility is calculated by, for instance, a formula {(a meter indication of meter indication data in March in the previous year)−(a meter indication of meter indication data in February in the previous year))}/(the number of days from a meter reading date in February in the previous year to a meter reading date in March in the previous year), whereas (the daily gas usage in March in the previous year) for each supply facility is calculated by, for instance, a formula {(a meter indication of meter indication data in April in the previous year)−(the meter indication of the meter indication data in March in the previous year)}/(the number of days from the meter reading date in March in the previous year to a meter reading date in April in the previous year).

In an example d80 of FIG. 8, an average of the daily gas usages within an area 18 in February in the previous year is indicated as 4.0 (m³/day), whereas an average of the daily gas usages within the area 18 in March in the previous year is indicated as 3.0 (m³/day). Hence, the rate of change β in the gas usage within the area 18 to be calculated by the CPU 301 is obtained as β=3.0/4.0. It should be noted that in FIG. 8, the rate of change β in the daily gas usage within the area 18 from January in the previous year to February in the previous year is indicated as β=4.0/3.8. Thus, the rate of increase or decrease β in the daily gas usage on an area basis in the same time in the previous year is calculated.

It should be noted that the rate of change in the gas usage on an area basis is not limited to that in the previous year, and that a period of time earlier than the previous year may be used instead.

In S105 of FIG. 4, the CPU 301 (the prediction unit 35) of the delivery server 101 is configured to modify the daily gas usage (m³/day) calculated in S102 in accordance with the rate of change α in the daily gas usage calculated in S103 and/or the rate of change β in the daily gas usage on an area basis calculated in S104, and predict the modified gas usage as a prospective gas usage to be consumed in the supply facility.

In S105, for instance, when the gas usage calculated in S102 is modified only in accordance with the rate of change α in the gas usage calculated in S103, the CPU 301 is configured to set a gas usage α×N (m³/day) obtained by multiplying the rate of change α in the gas usage (e.g., α=3.0/4.2) and the gas usage N (m³/day) calculated in S102 as the modified gas usage.

On the other hand, in S105, for instance, when the gas usage calculated in S102 is modified only in accordance with the rate of change β in the gas usage on an area basis calculated in S104, the CPU 301 is configured to set a gas usage β×N m³/day obtained by multiplying the rate of change β in the gas usage on an area basis (e.g., β=3.0/4.2) and the gas usage N (m³/day) calculated in S102 as the modified gas usage.

Alternatively, in S105, for instance, when the gas usage calculated in S102 is modified in accordance with the rate of change α in the gas usage calculated in S103 and the rate of change β in the gas usage on an area basis calculated in S104, the CPU 301 is configured to select a greater one of the rates of change, multiply the gas usage N (m³/day) calculated in S102 by the selected rate of change, and set the obtained value as the modified gas usage. Alternatively, in this case, the CPU 301 may be configured to calculate an average of the two rates of change α and β, multiply the gas usage N (m³/day) calculated in S102 by the calculated average, and set the obtained gas usage {(α+β)/2}N (m³/day) as the modified gas usage.

It should be noted that, when the two rates of change α and β are equal, a preliminarily-set high-prioritized rate of change is employed and multiplied by the gas usage N (m³/day) calculated in S102.

Alternatively in S105, the CPU 301 may be configured to predict the gas usage to be consumed by a customer on and after the meter indication date on the basis of an installation status of gas consuming equipment as a customer-dependent factor and/or a gas usage season as an external factor. For example, a GHP (gas heat pump) air conditioner, a heater and a cooler are examples of the gas consuming equipment.

In installing new gas consuming equipment, a rate of increase d (e.g., d=1.2) in the gas usage, which can be increased from the date (e.g., May 10, 2012) to start using the gas consuming equipment, has been preliminarily set. The CPU 301 is configured to modify the gas usage N (m³/day) calculated in S102 in accordance with the rate of change α in the gas usage and the rate of increase d and determine that the gas consumption from e.g., May 10, 2012 is a value obtained by α×d×N.

On the other hand, in removing already installed gas consuming equipment, the rate of increase d (e.g., d=1.2) in the gas usage, which has been preliminarily set, will be no longer used from the date (e.g., May 10, 2012) the gas consuming equipment is removed. The CPU 301 is configured to determine that the gas consumption from e.g., May 10, 2012 is a value obtained by α×N.

In changing already installed gas consuming equipment, the rate of increase d in the gas usage is updated in accordance with the change condition. The CPU 301 is configured to modify the gas usage N (m³/day) calculated in S102 in accordance with the rate of change α in the gas usage and the updated rate of increase d and determine that the gas consumption from the change date of the gas consuming equipment (e.g., May 10, 2012) is a value obtained by α×d×N.

Prediction of the gas usage based on a gas usage season is performed based on a predetermined reference value r. For example, the reference value r (e.g., r=1.5~1.1) has been preliminarily set for a cooling season (e.g., June to September) or a heating season (e.g., December to February). The CPU 301 is configured to calculate the gas usage consumed by the customer on and after the meter indication date on the basis of the reference value r set for either the cooling season or the heating season.

It should be noted that the aforementioned rate of increase d or reference value r is stored in the storage device 307 of the delivery server 101 so as to be associated with the customer ID and the meter number.

With the calculation of the gas usage in S105, it is possible to predict that the gas usage is supposed to be consumed on and after the meter reading date of the meter indication data received in S101. Thus, the prospective gas usage can be accurately predicted.

In S106 of FIG. 4, the CPU 301 (the prediction unit 35) of the delivery server 101 is configured to calculate a prospective remaining gas amount available in the supply facility by subtracting the gas usage predicted in S105 from the remaining gas amount in the supply facility. According to the flowchart of FIG. 4, the gas usage A (m³) consumed in the period from the previous meter reading date to the current meter reading date is calculated in S102. Thus, the CPU 301 is configured to preliminarily calculate the current remaining gas amount (in the current meter reading) by subtracting the gas usage A (m³) from the remaining gas amount in the supply facility managed by the storage device 307 before calculating the available prospective remaining gas amount.

In an example d90 of FIG. 9, the gas cylinder is delivered on August $25^{th}$; the gas meter is read on September $5^{th}$ and October $2^{nd}$; the gas usage from September $5^{th}$ to October $2^{nd}$ is set as 1.16 m³/day (the gas usage N (m³/day) calculated in S102 of FIG. 4); and the remaining gas amount as of October $2^{nd}$ is set as 95.6 m³ (the current remaining gas amount calculated in S106 of FIG. 4). In FIG. 9, d91 indicates month (date), whereas d92 indicates the remaining gas amount. Further, the gas usage on and after October $2^{nd}$ is set as 1.81 m³/day (for example, the gas usage αN (m³/day) modified in S105 of FIG. 4), and the amount of gas, remaining when gas is used at a rate of 1.81 m³/day from October $2^{nd}$, is depicted with a dashed line in FIG. 9. Accordingly, the prospective remaining gas amount in the supply facility can be predicted.

It should be noted that in FIG. 9, when a deliveryman operates the mobile terminal 105 and transmits information indicating completion of delivery of the gas cylinder to the delivery server 101 on August $25^{th}$ as the delivery date, the current remaining gas amount of the gas cylinder is set to an initial value (the value of "gas cylinder capacity" in FIG. 3) in the storage device 307 of the delivery server 101.

As explained above, the delivery server 101 of the present exemplary embodiment is configured to calculate the rates/rate of change α and/or β in the gas usage on the basis of sets of meter indication data and predict the prospective gas usage and the prospective remaining gas amount on the basis of the rates/rate of change. Thus, prospective gas demand can be accurately predicted. In this case, the gas cylinder can be delivered on the premise that the prospective gas demand is known. Therefore, this also serves to prevent gas shortage.

It should be noted that calculation of the gas usage and that of the remaining gas amount are not limited to those of the aforementioned example, and are enabled from various perspectives. For example, when respective gas cylinders of multiple customers are concentrated in a single location (concentrated system), the CPU 301 is configured to preliminarily group the multiple customers connected to the single location and calculate (predict) the gas usage and the remaining gas amount for all the intended customers belonging to the same group on the basis of the sum of the gas usages of the respective customers belonging to the same group.

Next, explanation will be provided for modifications of the present exemplary embodiment.

Modification 1

With reference to FIG. 4, explanation has been mainly provided above for the process of predicting the remaining gas amount where a single gas cylinder is installed in a supply facility ("number of cylinders"=1 in FIG. 3). Aside from this, chances are that the remaining gas amount is predicted where two gas cylinders are installed in a supply facility (in FIG. 3, "number of cylinders"=2 and "entire/half classification"="1" indicating entire replacement).

In this case, the CPU 301 (the prediction unit 35) of the delivery server 101 is configured to predict the prospective gas usage for each gas cylinder in a supply facility to be processed (S105 in FIG. 4) and calculate the prospective remaining gas amount of each gas cylinder by reducing the aforementioned gas usage predicted in S105 from the remaining gas amount in each gas cylinder (S106 in FIG. 4).

The invention claimed is:
1. A gas demand prediction system of predicting gas usages in a plurality of supply facilities, comprising:

a reception unit configured to receive respective sets of meter indication data of a plurality of gas meters in the plurality of supply facilities;

a storage unit configured to store the respective sets of meter indication data of the plurality of supply facilities, and one or more areas in which the plurality of supply facilities are respectively located;

a gas usage calculating unit configured to calculate the gas usage consumed in each of the plurality of supply facilities on a basis of comparison between corresponding sets of meter indication data stored in the storage unit;

a first rate of change calculating unit configured to calculate a first rate of change in a past gas usage in each of the plurality of supply facilities for the corresponding sets of meter indication data on a basis of comparison between the corresponding sets of meter indication data;

a second rate of change calculating unit configured to calculate a second rate of change in a past gas usage in the supply facilities located in a same area on a basis of comparison between corresponding sets of meter indication data in the same area stored in the storage unit; and a prediction unit configured to modify the calculated gas usage on a basis of the first rate of change in each of the plurality of supply facilities and the second rate of change in the same area as an area in which each of the plurality of supply facilities are located, and predict the modified gas usage as a prospective gas usage to be consumed in the each of the plurality of supply facilities.

2. The gas demand prediction system according to claim 1, wherein the second rate of change in the gas usage is changes rates of an average in past daily gas usages within the each of the one or more areas in the same time as a meter reading date of the received sets of meter indication data.

3. The gas demand prediction system according to claim 1, further comprising:

a management unit configured to manage a remaining gas amount in the each of the plurality of supply facilities, wherein the prediction unit is configured to calculate a prospective remaining gas amount available in the each of the plurality of supply facilities by subtracting the predicted prospective gas usage from the remaining gas amount in the each of the plurality of supply facilities.

4. The gas demand prediction system according to claim 1, wherein, when the supply facilities is equipped with a plurality of gas cylinders, the prediction unit is configured to predict a prospective remaining gas amount in each of the plurality of gas cylinders in the supply facilities by predicting the prospective gas usage in the each of the plurality of gas cylinders and subtracting the predicted prospective gas usage from a remaining gas amount in the each of the plurality of gas cylinders.

5. The gas demand prediction system according to claim 1, wherein, when the plurality of supply facilities is equipped with a plurality of gas cylinders belonged to a plurality of customers in a concentrated manner, the prediction unit is configured to predict the gas usages and remaining gas amounts of all the corresponding customers within the supply facilities on a basis of a sum of the gas usages of the respective customers in the supply facilities.

6. A gas demand prediction method of causing a computer to predict gas usages in a plurality of supply facilities, the computer comprising a storage unit configured to store one or more areas in which the plurality of supply facilities are respectively located, the method comprising the steps of:

receiving respective sets of meter indication data of a plurality of gas meters in the plurality of supply facilities;

storing the respective sets of meter indication data of the plurality of supply facilities in a storage unit;

calculating the gas usage consumed in each of the plurality of supply facilities on a basis of comparison between corresponding sets of meter indication data stored in the storage unit;

calculating a first rate of change in a past gas usage in each of the plurality of supply facilities for the corresponding sets of meter indication data on a basis of comparison between the corresponding sets of meter indication data, and calculating a second rate of change in a past gas usage in the supply facilities located in a same area on a basis of comparison between corresponding sets of meter indication data in the same area stored in the storage unit; and modifying the calculated gas usage on a basis of the first rate of change in each of the plurality of supply facilities and the second rate of change in the same area as an area in which each of the plurality of supply facilities are located, and predicting the modified gas usage as a prospective gas usage to be consumed in the each of the plurality of supply facilities.

7. A computer readable storage medium storing a program for causing a computer to execute a gas demand prediction method comprising the steps of:

receiving respective sets of meter indication data of a plurality of gas meters in a plurality of supply facilities;

storing the respective sets of meter indication data of the plurality of supply facilities in a storage unit;

calculating the gas usage consumed in each of the plurality of supply facilities on a basis of comparison between corresponding sets of meter indication data stored in the storage unit;

calculating a first rate of change in a past gas usage in each of a plurality of gas cylinders the plurality of supply facilities for the corresponding sets of meter indication data on a basis of comparison between the corresponding sets of meter indication data of the each of the plurality of gas cylinders, and calculating a second rate of change in a past gas usage in the supply facilities located in a same area on a basis of comparison between corresponding sets of meter indication data in the same area stored in the storage unit; and modifying the calculated gas usage in accordance with on a basis of the first rate of change in each of the plurality of supply facilities and the second rate of change in the same area as an area in which each of the plurality of supply facilities are located, and predicting the modified gas usage as a prospective gas usage to be consumed in the each of the plurality of supply facilities.

* * * * *